(12) United States Patent
Hwang (10) Patent No.: US 8,909,234 B2
(45) Date of Patent: Dec. 9, 2014

(54) DATA COMMUNICATION NETWORK AND DATA COMMUNICATION METHOD USING TRANSMISSION OF SOFT-DECISION INFORMATION

(75) Inventor: Chan Soo Hwang, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 744 days.

(21) Appl. No.: 12/428,911

(22) Filed: Apr. 23, 2009

(65) Prior Publication Data

US 2010/0062775 A1 Mar. 11, 2010

(30) Foreign Application Priority Data

Sep. 11, 2008 (KR) ........................ 10-2008-0089691

(51) Int. Cl.
| | | |
|---|---|---|
| H04W 36/00 | (2009.01) | |
| H04B 7/02 | (2006.01) | |
| H04B 1/06 | (2006.01) | |
| H04B 7/10 | (2006.01) | |
| H04L 27/00 | (2006.01) | |
| H03M 13/03 | (2006.01) | |
| H04W 36/18 | (2009.01) | |

(52) U.S. Cl.
CPC .................................. H04W 36/18 (2013.01)
USPC ........... 455/442; 455/101; 455/273; 375/267; 375/299; 375/347; 714/794

(58) Field of Classification Search
USPC ......... 455/442, 273, 7–25, 500–506, 524, 59, 455/550.1, 561, 101–104; 375/347, 349, 375/340, 341, 267, 299; 714/794–795; 370/216, 242
See application file for complete search history.

(56) References Cited

U.S. PATENT DOCUMENTS

| | | | |
|---|---|---|---|
| 6,343,210 B1 * | 1/2002 | Emmons et al. | 455/226.3 |
| 6,571,212 B1 * | 5/2003 | Dent | 704/270.1 |
| 7,058,407 B2 | 6/2006 | Chi et al. | |
| 2001/0018346 A1 * | 8/2001 | Okajima et al. | 455/437 |
| 2002/0119780 A1 | 8/2002 | Roux et al. | |
| 2002/0173309 A1 * | 11/2002 | Shahidi et al. | 455/442 |
| 2003/0145269 A1 * | 7/2003 | Kuo et al. | 714/749 |
| 2004/0229649 A1 | 11/2004 | Nishimura et al. | |
| 2005/0025076 A1 * | 2/2005 | Chaudhuri et al. | 370/310 |

(Continued)

FOREIGN PATENT DOCUMENTS

| | | |
|---|---|---|
| EP | 1018816 A1 | 7/2000 |
| EP | 1855394 A1 * | 11/2007 |

(Continued)

OTHER PUBLICATIONS

Japanese Office Action issued Aug. 13, 2013 in counterpart Japanese Application No. 2011-526798 (3 pages, in Japanese).

*Primary Examiner* — Michael Mapa
(74) *Attorney, Agent, or Firm* — NSIP Law (57) ABSTRACT

A data communication network to transmit and/or receive data using soft-decision information is provided. A target access point in a data communication network may compute soft-decision information with respect to information bits corresponding to a transmission symbol, and transmit the computed soft-decision information to a destination device or an access point connected to the destination device. The destination device or the access point connected to the destination device may combine soft-decision information of a plurality of access points, and detect information bits based on the combined soft-decision information.

22 Claims, 9 Drawing Sheets

(56) References Cited

U.S. PATENT DOCUMENTS

| | | | |
|---|---|---|---|
| 2005/0271012 A1* | 12/2005 | Agrawal et al. | 370/331 |
| 2005/0272432 A1* | 12/2005 | Ji et al. | 455/449 |
| 2006/0146745 A1* | 7/2006 | Cai et al. | 370/328 |
| 2006/0291599 A1* | 12/2006 | Strodtbeck et al. | 375/347 |
| 2007/0054621 A1 | 3/2007 | Larsson | |
| 2007/0149135 A1 | 6/2007 | Larsson et al. | |
| 2009/0161742 A1* | 6/2009 | Ivory et al. | 375/225 |

FOREIGN PATENT DOCUMENTS

| | | |
|---|---|---|
| JP | 10-247873 A | 9/1998 |
| JP | 2008-514124 A | 5/2008 |
| WO | WO 00/57593 A1 | 9/2000 |

\* cited by examiner

DATA COMMUNICATION NETWORK AND DATA COMMUNICATION METHOD USING TRANSMISSION OF SOFT-DECISION INFORMATION

CROSS-REFERENCE TO RELATED APPLICATION

This application claims the benefit under 35 U.S.C. §119 (a) of a Korean Patent Application No. 10-2008-0089691, filed on Sep. 11, 2008, in the Korean Intellectual Property Office, the entire disclosure of which is incorporated herein by reference.

BACKGROUND

1. Field

The following description relates to a data communication network where a plurality of communication devices computes soft-decision information and transmits the soft-decision information to another communication device.

2. Description of the Related Art

A plurality of independent channels is formed between a base station and a mobile station. A signal transmitted from a mobile station is transmitted through a plurality of independent channels, and a base station efficiently combines signals transmitted through the plurality of independent channels. Accordingly, a superior receiving performance may be obtained, which is called a diversity effect.

In particular, 'macro diversity' may be efficiently used where a mobile station performs a handover, since a signal transmitted from a mobile station is received in two base stations as a similar multipath fading occurs. Accordingly, an achievable diversity gain is significant, and thus macro diversity may be used where a mobile station performs a handover. However, a large amount of overhead is generated where received signals are combined to obtain a diversity gain.

In a conventional communication system using macro diversity, at least two base stations receive a transmission signal of a mobile station. Each base station transmits a received signal to a Radio Network Controller (RNC). The RNC combines transmitted signals and detects a transmission signal. In this instance, the detected transmission signal is transmitted to a destination through a switch, and the like. However, a large amount of overhead may be generated in an RNC through the above-described process. Also, the process may not applicable where base stations are not managed by a single RNC.

SUMMARY

In one general aspect, there may be provided a method of operating a target access point, the method including receiving a transmission symbol transmitted by a source device to a destination device, computing soft-decision information for a soft decision with respect to information bits corresponding to the transmission symbol, detecting the information bits based on the computed soft-decision information, and transmitting the soft-decision information or the detected information bits to the destination device or an access point connected to the destination device. The destination device or the access point connected to the destination device may combine the soft-decision information transmitted by each of a plurality of access points, and detect the information bits using the combined soft-decision information.

In another general aspect, there may be provided a method of operating a destination device or an access point connected to the destination device, the method including receiving soft-decision information about information bits corresponding to a transmission symbol from a plurality of access points, the transmission symbol being transmitted from a source device to the destination device, combining the soft-decision information of the plurality of access points, and detecting the information bits using the combined soft-decision information.

In still another generally aspect, there may be provided a method of operating a router, the method including receiving soft-decision information about information bits corresponding to a transmission symbol from a plurality of access points or at least one neighbor router, the transmission symbol being transmitted from a source device to a destination device, combining soft-decision information of the plurality of access points or the at least one neighbor router, and transmitting the combined soft-decision information to the destination device or an access point connected to the destination device.

In a further general aspect, a communication device for a destination device or an access point connected to the destination device may be provided, the communication device including a receiving unit to receive soft-decision information about information bits corresponding to a transmission symbol from a plurality of access points, the transmission symbol being transmitted from a source device to the destination device, a combining unit to combine the soft-decision information of the plurality of access points, a detection unit to detect the information bits using the combined soft-decision information, and an error check unit to check for an error in the detected information bits.

Other features will become apparent to those skilled in the art from the following detailed description, which, taken in conjunction with the attached drawings, discloses exemplary embodiments.

BRIEF DESCRIPTION OF THE DRAWINGS

Throughout the drawings and the detailed description, the same drawing reference numerals will be understood to refer to the same elements, features, and structures.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, descriptions of well-known functions and constructions are omitted to increase clarity and conciseness.

Figure 1:
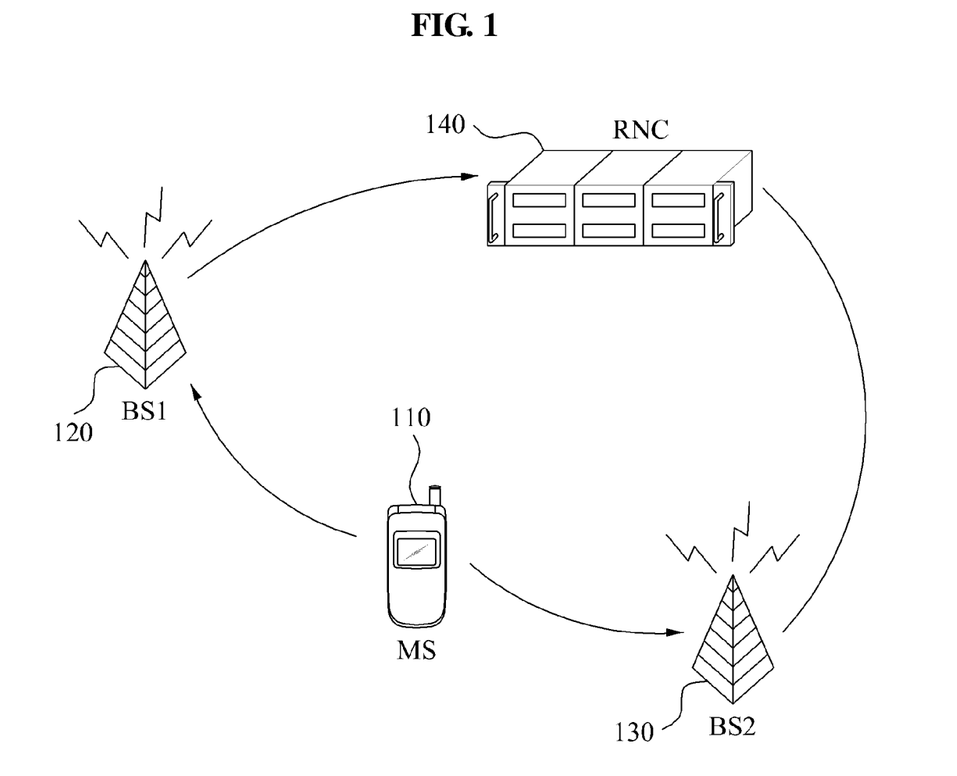
FIG. 1 is a diagram illustrating a network including two base stations managed by a single Radio Network Controller (RNC).
Figure 2:
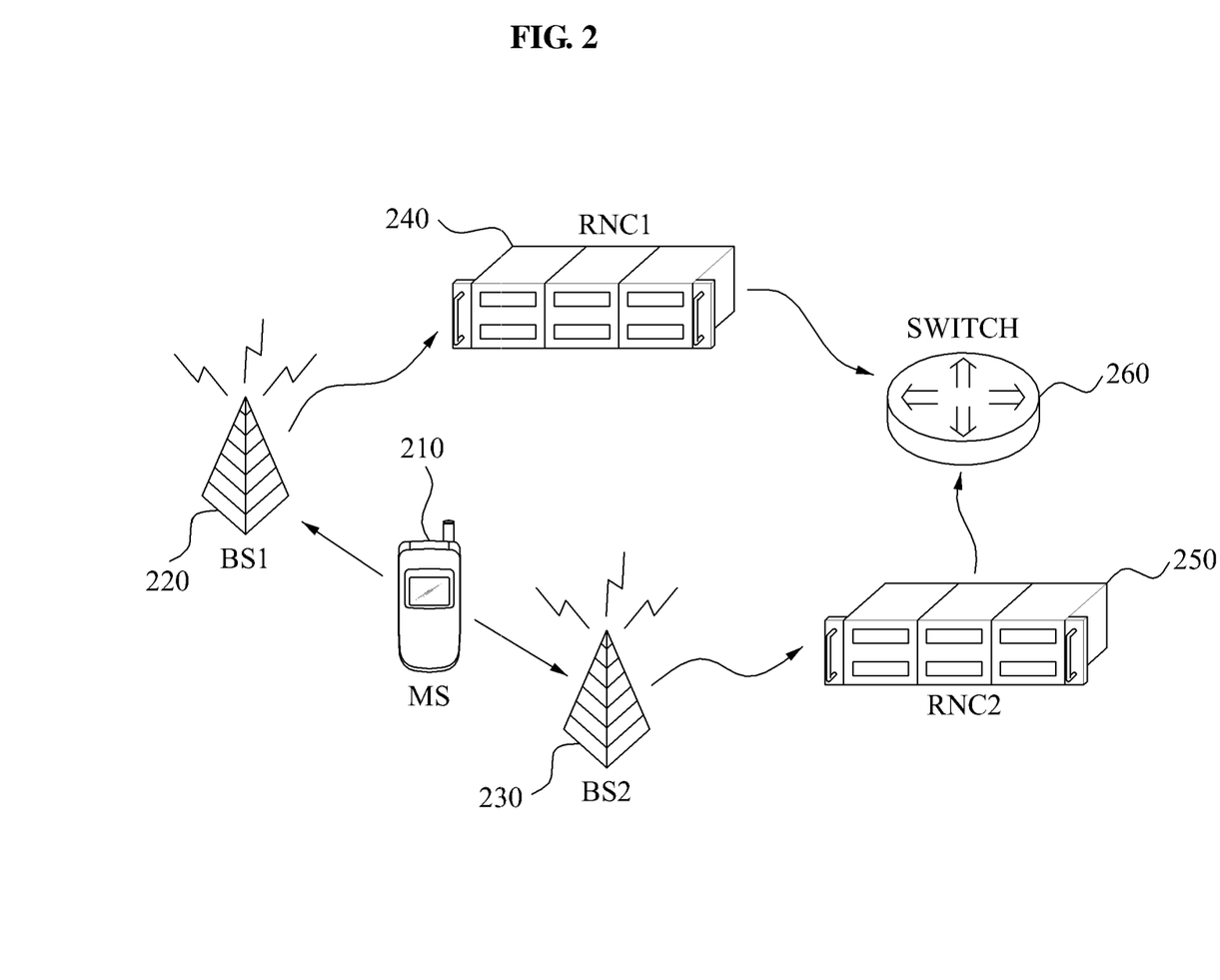
FIG. 2 is a diagram illustrating a network including two base stations managed by two different RNCs.
Figure 3:
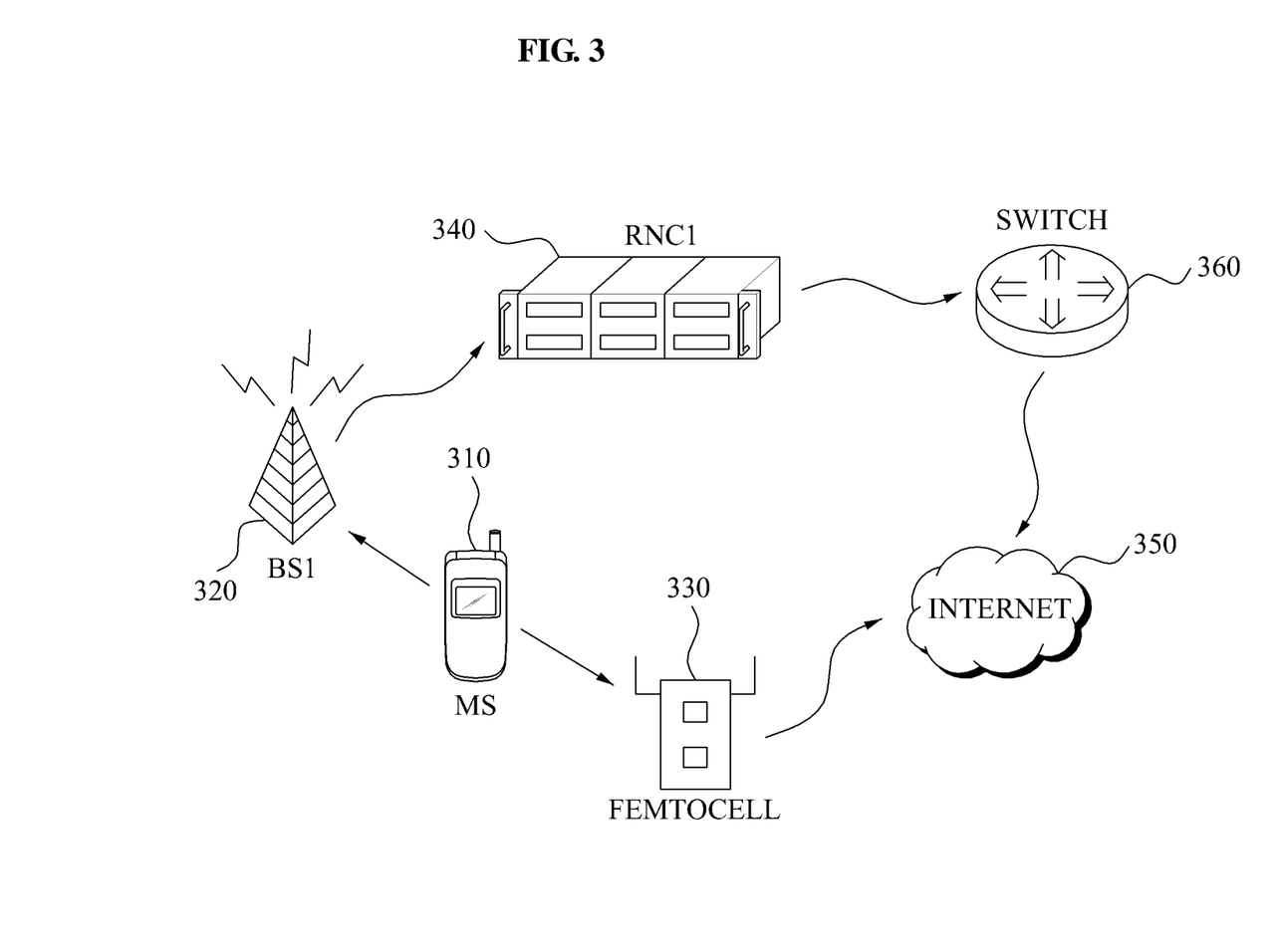
FIG. 3 is a diagram illustrating a network including a femto cell base station.

FIGS. 1 through 3 illustrate a variety of networks using macro diversity.

FIG. 1 shows a network including two base stations (BSs) 120 and 130 managed by a single Radio Network Controller (RNC).

Referring to FIG. 1, a BS1 120 and a BS2 130 may be managed by a single RNC 140.

A transmission signal of a mobile station (MS) 110 may be received in the BS1 120 and the BS2 130. The BS1 120 and the BS2 130 may transmit the received signals to the RNC 140. In this instance, the BS1 120 and the BS2 130 may quantize the received signals, and transmit the quantized received signals to the RNC 140. In general, the RNC 140 may be wired to the BS1 120 and the BS2 130.

The RNC 140 may combine the received signals of the BS 1120 and the BS2 130, and detect the transmission signal. Where the detected transmission signal is binary data, the binary data reaches a destination through a switch, and the like.

The RNC 140 combines the received signals of the BS1 120 and the BS2 130, and thereby may obtain a diversity gain. In this instance, the received signals of BS 1 120 and BS2 130 are transmitted through independent channels which are different from each other.

However, the RNC 140 may perform a large amount of computations in order to combine the received signals of the BS1 120 and the BS2 130. Also, since the BS1 120 and the BS2 130 transmit the quantized received signals, network traffic may increase. The RNC 140 is managed by a communication service provider. Accordingly, where the BS1 120 and the BS2 130 are connected to different RNCs, respectively, a single RNC may not combine the received signals of the BS1 120 and the BS2 130. Also, an apparatus such as a femto cell base station may not be precisely controlled by an RNC, and thus received signals of a plurality of BSs may not be combined to obtain a diversity gain in a network including the femto cell base station.

FIG. 2 shows a network including two BSs managed by two different RNCs.

Referring to FIG. 2, an MS 210 may transmit a transmission signal to a BS1 220 and a BS2 230. The BS1 220 and the BS2 230 may quantize received signals, and transmit the quantized received signals to an RNC1 240 and an RNC2 250.

In this instance, the BS1 220 may be managed by the RNC1 240, and the BS2 230 may be managed by the RNC2 250. The RNC1 240 and the RNC2 250 may be managed by different communication service providers. Also, the RNC1 240 and the RNC2 250 may not manage received signals of the BS1 220 and the BS2 230 managed by different communication service providers.

Accordingly, where the RNC1 240 and the RNC2 250 are not managed by a same communication service provider, or the BS1 220 and the BS2 230 are not managed by the same communication service provider, the received signals of the BS 1 220 and the BS2 230 may not be combined to obtain a diversity gain, although the RNC1 240 and the RNC2 250 are connected to each other through a switch 260.

FIG. 3 shows a network including a femto cell base station 330.

Referring to FIG. 3, an MS 310 may transmit a transmission signal to a BS1 320 and the femto cell base station 330.

The BS1 320 may be managed by an RNC1 340, and RNC1 340 may be connected to the femto cell base station 330 through a switch 360 and the Internet 350.

In this instance, the BS1 320 may quantize a received signal and transmit the received signal to the RNC1 340. However, the femto cell base station 330 may not be precisely controlled by any RNC. Accordingly, since the BS1 320 and the femto cell base station 330 are not managed by a same RNC, received signals of the BS1 320 and the femto cell base station 330 may not be combined.

Figure 4:
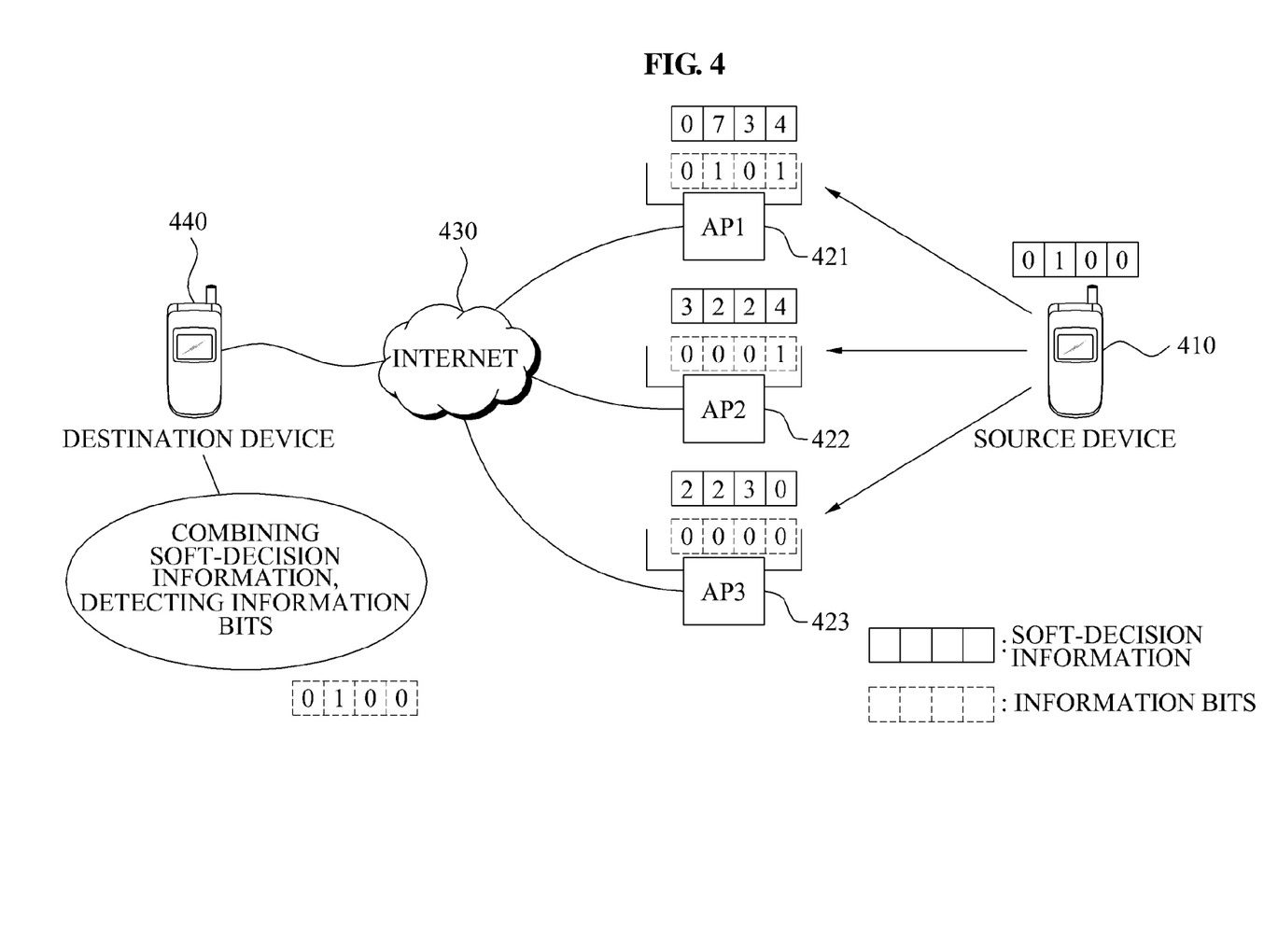
FIG. 4 is a diagram illustrating a network including access points transmitting soft-decision information according to an exemplary embodiment.

FIG. 4 shows a network including access points transmitting soft-decision information according to an exemplary embodiment.

Referring to FIG. 4, a source device 410 may transmit a transmission symbol to a plurality of access points (APs), that is, an AP1 421, an AP2 422, and an AP3 423, through wireless channels independent of each other. A portion of the AP1 421, the AP2 422, and the AP3 423 may receive the transmission symbol of the source device 410 through logical connections. Remaining APs excluding the portion of the AP1 421, the AP2 422, and the AP3 423 may overhear the transmission symbol of the source device 410 without the logical connections.

In this instance, each of the AP1 421, the AP2 422, and the AP3 423 may compute soft-decision information for soft decision based on a received signal. For example, the soft-decision information may include a Log Likelihood Ratio (LLR).

Also, the soft-decision information computed by each of the AP1 421, the AP2 422, and the AP3 423 may be transmitted to a destination device 440 through the Internet 430. In this instance, the destination device 440 may combine the soft-decision information of the AP1 421, the AP2 422, and the AP3 423, and may detect the transmission symbol or information bits corresponding to the transmission symbol.

Accordingly, the destination device 440 may use the soft-decision information of each of the AP1 421, the AP2 422, and the AP3 423 to detect the information bits, and thus a diversity gain may be obtained. Each of the AP1 421, the AP2 422, and the AP3 423 may not need to quantize the received signal and transmit the received signal to the destination device 440 or a separate RNC. Also, each of the AP1 421, the AP2 422, and the AP3 423 may not need to transmit the quantized received signal to obtain the diversity gain. Accordingly, an overhead generated throughout a network may be reduced.

A received signal of the AP1 421, $y_1$, may be represented as, $$y_1 = h_1 x + n \qquad \text{[Equation 1]}$$

where x may denote the transmission symbol of the source device 410, $h_1$ may denote a channel formed between the AP1 421 and the source device 410, and n may denote an Additive White Gaussian Noise (AWGN). The transmission symbol x may be a transmission symbol modulated according to a variety of modulation schemes. For example, where the transmission symbol x is modulated according to a 16 Quadrature Amplitude Modulation (QAM) scheme, information bits of four bits corresponding to the transmission symbol x may be b1, b2, b3, and b4.

The AP1 421 performs a one-tap equalization with respect to the received signal, and thereby may generate $\tilde{x}_{1,n}$, which is given by, $$\tilde{x}_{1,n} = \frac{y_{1,n}}{h_{1,n}} = x_n + \frac{z_{1,n}}{h_{1,n}}. \quad \text{[Equation 2]}$$

Here, n may denote an index of a transmission symbol x, and $z_{1,n}$ may be an equalization coefficient of a one-tap equalizer used by AP1 421.

In this instance, AP1 421 may compute an LLR ($L^k_{1,n}$) with respect to information bits based on the received signal. $L^k_{1,n}$ may be computed by, $$L^k_{1,n} = \log\left(\frac{Pr(b_k=1|y_1)}{Pr(b_k=0|y_1)}\right) \quad \text{[Equation 3]}$$
$$\cong CSI_{1,n}\left[\min_{x\in\chi^k_0}|\tilde{x}_{1,n}-x|^2 - \min_{x\in\chi^k_1}|\tilde{x}_{1,n}-x|^2\right]$$
$$= CSI_{1,n}D(\tilde{x}_{1,n},k).$$

For reference, the AP2 422 and the AP3 423 may compute an LLR ($L^k_{2,n}$) and an LLR ($L^k_{3,n}$) based on Equation 3.

In Equation 3, $$CSI_{1,n} = \frac{|h_{1,n}|^2}{\sigma^2}$$

where $\sigma^2$ may be a variance of AWGN. Also, $\chi^k_b$ may be a set of symbols where a $k_{th}$ bit is b from among QAM symbols. For example, in the 16 QAM, $\chi^{k=1}_{b=0}$ may be a set of eight constellation points on a second quadrant and a third quadrant from among 16 QAM symbols. Also, $\omega^{k=1}_{b=1}$ may be a set of eight constellation points on a first quadrant and a fourth quadrant. Also, $CSI_{1,n}$ may be used as a weight factor where combining LLRs. $CSI_{1,n}$ is associated with an amplitude of a channel, and $D(\tilde{x}_{1,n},k)$ is not associated with the amplitude of the channel. $D(\tilde{x}_{1,n},k)$ may be associated with a probability related to whether a received complex number is 1 or 0 in a normalized constellation.

Accordingly, each of AP1 421, AP2 422, and AP3 423 may compute $LLR^k_n$ based on the received signal. $LLR^k_n$ of AP1 421, AP2 422, and AP3 423 may be transmitted to the destination device 440. The destination device 440 may combine $LLR^k_n$ of each of the AP1 421, the AP2 422, and the AP3 423, detect a transmission symbol or information bits using the combined $LLR^k_n$, and thereby may obtain the diversity gain.

Each of the AP1 421, the AP2 422, and the AP3 423 may quantize $LLR^k_n$, and transmit the quantized $LLR^k_n$ to the destination device 440. In this instance, $CSI_n$ does not change during a single transmission symbol duration, and $D(\tilde{x}_n,k)$ may change during the single transmission symbol duration. Accordingly, each of the AP1 421, the AP2 422, and the AP3 423 does not quantize the entire $LLR^k_n$, and may separately quantize each of $CSI_n$ and $D(\tilde{x},k)$. That is, each of the AP1 421, the AP2 422, and the AP3 423 may transmit $CSI_n$, quantized with respect to N-bit information bits once, and transmit the quantized $D(\tilde{x},k)$ N times. Hence, each of the AP1 421, the AP2 422, and the AP3 423 may transmit $LLR^k_n$ more efficiently.

Also, each of the AP1 421, the AP2 422, and the AP3 423 may detect the information bits based on the received signal. That is, each of the AP1 421, the AP2 422, and the AP3 423 may detect the transmission symbol or information bits based on the computed soft-decision information.

Each of A the P1 421, the AP2 422, and the AP3 423 may check whether an error exists in the detected information bits. For example, each of the AP1 421, the AP2 422, and the AP3 423 may use a Cyclic Redundancy Check (CRC).

Where the error does not exist in the detected information bits, each of the AP1 421, the AP2 422, and the AP3 423 may transmit the detected information bits to the destination device 440 through the Internet 430. Conversely, where the error exists in the detected information bits, each of the AP1 421, the AP2 422, and the AP3 423 may transmit the soft-decision information to the destination device 440 so that the destination device 440 detects the information bits.

Also, the information bits may be designated by a box with dotted-lines illustrated in FIG. 4, and the soft-decision information may be designated by a box with solid lines also illustrated in FIG. 4. The source device 410 may transmit a transmission symbol to the AP1 421, the AP2 422, and the AP3 423 through a wireless channel. The transmission symbol corresponds to information bits '0100.'

In this instance, AP1 421 may compute soft-decision information as '0734' based on the received signal. In this instance, where each bit of the soft-decision information is closer to '0,' a probability that information bits corresponding to each of the bits of the soft-decision information is '0' may increase. Also, where each of the bits of the soft-decision information is closer to '7', a probability that information bits corresponding to each of the bits of the soft-decision information is '1' may increase. Similarly, the AP2 422 and the AP3 423 may compute the soft-decision information as '3224' and '2230,' respectively.

In this instance, each of the AP1 421, the AP2 422, and the AP3 423 may detect information bits based on the soft-decision information. That is, the AP1 421, the AP2 422, and the AP3 423 may detect the information bits as '0101,' '0001,' and '0000,' respectively. Where an error does not exist in the information bits detected by the AP1 421, the AP2 422, and the AP3 423, the detected information bits may be transmitted to the destination device 440. However, here, it may be ascertained that the error exists in the information bits detected by the AP1 421, the AP2 422, and the AP3 423.

Where the error exists in the information bits detected by the AP1 421, the AP2 422, and the AP3 423, the AP1 421, the AP2 422, and the AP3 423 may transmit the soft-decision information computed through the Internet 430 to the destination device 440. In this instance, the destination device 440 combines the soft-decision information of each of the AP1 421, the AP2 422, and the AP3 423, and thereby may precisely detect information bits. For example, the destination device 440 may generate combined soft-decision information by adding the soft-decision information of each of the AP1 421, the AP2 422, and the AP3 423, and compare the combined soft-decision information and a predetermined threshold value to detect the information bits.

For example, combining of an LLR of AP1 421 and an LLR of AP2 422 may be given by, $$L^k_n = \log\left(\frac{Pr(b_k=1|y_1,y_2)}{Pr(b_k=0|y_1,y_2)}\right) \quad \text{[Equation 4]}$$
$$= \log\left(\frac{Pr(b_k=1|y_1)Pr(b_k=1|y_2)}{Pr(b_k=0|y_1)Pr(b_k=0|y_2)}\right)$$
$$= \log\left(\frac{Pr(b_k=1|y_1)}{Pr(b_k=0|y_1)}\right) + \log\left(\frac{Pr(b_k=1|y_2)}{Pr(b_k=0|y_2)}\right)$$
$$\cong CSI_{1,n}D(\tilde{x}_{1,n},k) + CSI_{2,n}D(\tilde{x}_{2,n},k)$$

Here, where the destination device 440 generates $L_n^k$ by combining the LLR of the AP1 421 and the LLR of the AP2 422 based on Equation 4, the destination device 440 compares $L_n^k$ and a threshold value, and thereby may detect the information bits. However, the combining of LLRs may be performed by computing an average of LLRs, selecting a maximum value from the LLRs, and the like, to reduce complexity.

Also, for example, where an LLR is quantized into eight values (0 through 7), the soft-decision information of each of the AP1 421, the AP2 422, and the AP3 423 may be three bits. In this instance, 9 (3×3) bits are required to transmit the soft-decision information computed by the AP1 421, the AP2 422, and the AP3 423 to the destination device 440. That is, an overhead may be generated in a network where transmitting the soft-decision information. A method of reducing the overhead is described with reference to FIG. 5.

Figure 5:
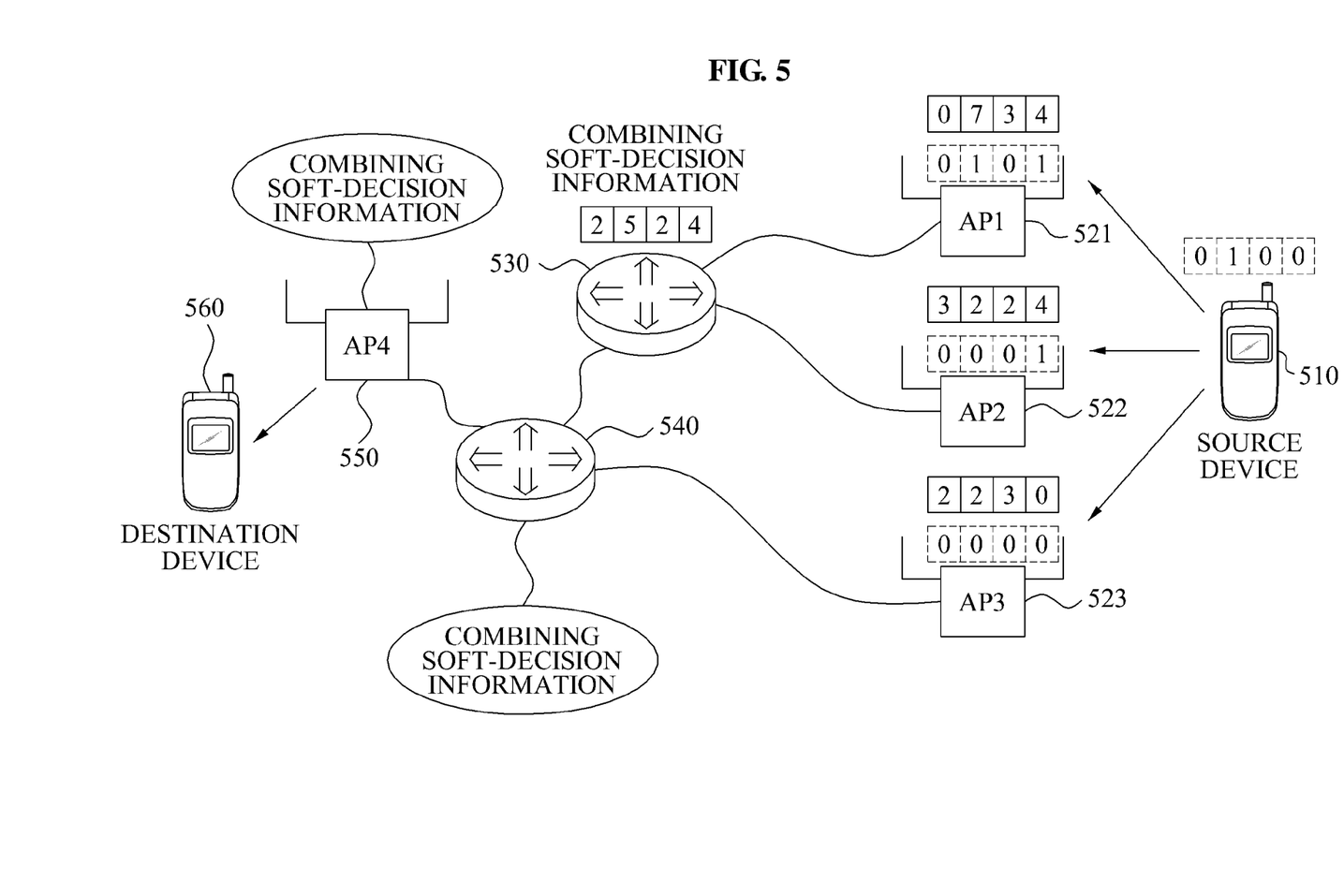
FIG. 5 is a diagram illustrating a network including a destination device or an access point connected to the destination device according to another exemplary embodiment.

FIG. 5 shows a network including a destination device or an access point connected to the destination device according to another exemplary embodiment.

Referring to FIG. 5, a plurality of APs, that is, an AP1 521, an AP2 522, and an AP3 523, are connected to routers 530 and 540. In this instance, the routers 530 and 540 may combine soft-decision information of the AP1 521, the AP2 522, and the AP3 523, and transmit the combined soft-decision information to a destination device 560 or an AP4 550 connected to the destination device 560. That is, the routers 530 and 540 may combine the soft-decision information as described in FIG. 4.

Accordingly, the routers 530 and 540 combine the soft-decision information of the AP1 521, the AP2 522, the AP3 523, and the destination device 560, and thus overhead, generated since the AP1 521, the AP2 522, and the AP3 523 directly transmit the soft-decision information to the destination device 560 or the AP4 550, may be reduced.

Also, the AP4 550 may finally combine the soft-decision information instead of the destination device 560. That is, although the destination device 440 may finally combine the soft-decision information in the network illustrated in FIG. 4, the AP4 550 may finally combine the soft-decision information and detect information bits using the combined soft-decision information. The AP4 550 may transmit the detected information bits to the destination device 560.

Also, the information bits may be designated by a box with dotted-lines illustrated in FIG. 5, and the soft-decision information may be designated by a box with solid lines also illustrated in FIG. 5. A source device 510 may transmit information bits '0100.' The information bits '0100' correspond to a transmission symbol.

Each of the AP1 521, the AP2 522, and the AP3 523 may compute an LLR as '0734,' '3224,' and '2230,' respectively, based on a received signal. In this instance, each of the AP1 521, the AP2 522, and the AP3 523 may detect information bits as '0101,' '0001,' and '0000' using the LLR. However, it may be ascertained that an error exists in the information bits, '0101,' '0001,' and '0000,' as detected by each of the AP1 521, the AP2 522, and the AP3 523.

Also, the LLRs of the AP1 521 and the AP2 522, that is, '0734' and '3224,' respectively, may be transmitted to the router 530. In this instance, the router 530 may combine the LLRs of AP1 521 and AP2 522, that is, '0734' and '3224'. Accordingly, the router 530 may generate an average value of the LLRs of the AP1 521 and the AP2 522. The average value of the LLRs of the AP1 521 and the AP2 522 may be the combined LLR, '2524'. Also, the router 530 may transmit the combined LLR, '2524' to the router 540.

The router 540 may receive LLRs of the router 530 and the AP3 523, that is, '2524' and '2230.' In this instance, the router 540 may combine the LLRs of the router 530 and the AP3 523, and transmit the combined LLR to the AP4 550.

Also, the AP4 550 may detect information bits using the LLR transmitted by the router 540, and transmit the detected information bits to the destination device 560.

Figure 6:
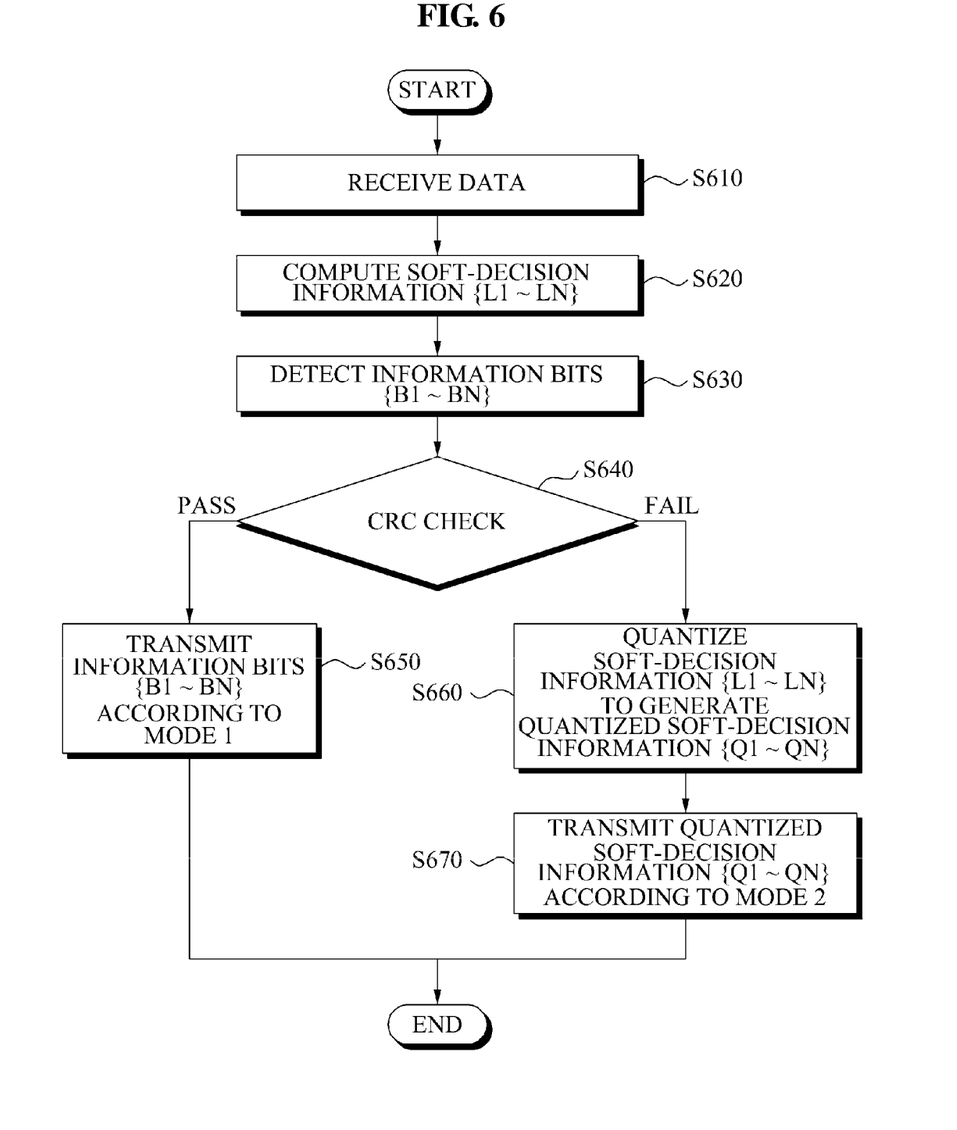
FIG. 6 is a flowchart illustrating a method of operating a target access point according to an exemplary embodiment

FIG. 6 is a flowchart illustrating a method of operating a target access point according to an exemplary embodiment.

Figure 7:
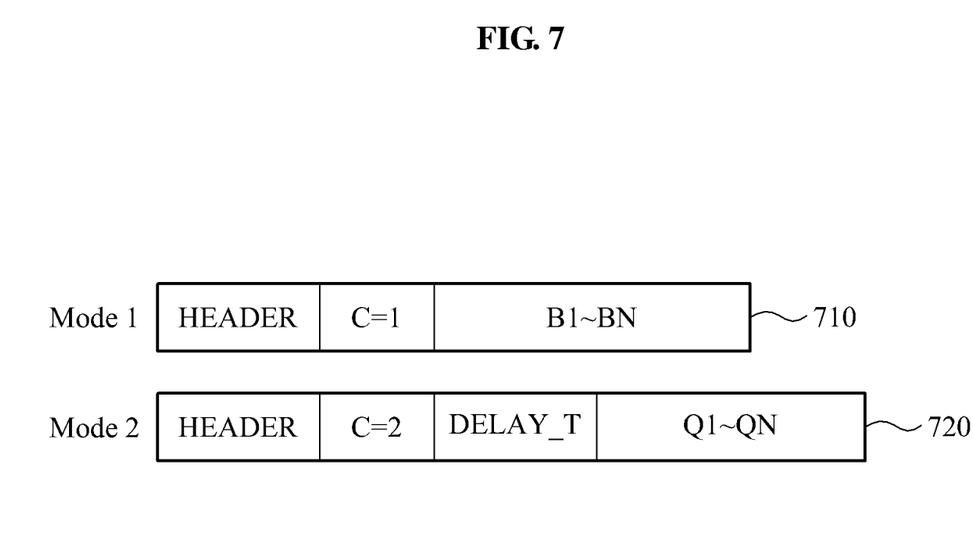
FIG. 7 is a diagram illustrating a frame configuration of packets according to an exemplary embodiment.

FIG. 7 shows a frame configuration of packets according to an exemplary embodiment.

Referring to FIG. 6, in operation S610, a target access point may receive data from a source device. The target access point may be any one of a plurality of APs. The data may include N-bit information bits corresponding to a transmission symbol of the source device.

In operation S620, the target access point may compute soft-decision information with respect to the N-bit information bits. That is, the target access point may compute an LLR with respect to the N-bit information bits. Here, it may be assumed that the LLR with respect to the N-bit information bits are {L1, L2, ..., LN}.

In operation S630, the target access point may detect the N-bit information bits based on the soft-decision information. Here, it may be assumed that the detected N-bit information bits are {b1, b2, ..., bN}.

In operation S640, the target access point may check for an error with respect to the detected N-bit information bits according to a CRC scheme.

In operation S650, where the error does not exist in the detected N-bit information bits, the target access point may transmit the N-bit information bits to a neighboring router, AP, destination device, and the like, based on a frame configuration of Mode 1 of FIG. 7.

In this instance, referring to FIG. 7, a packet according to the frame configuration of Mode 1 may include a header, identification information (C=1), and the detected N-bit information bits {b1, b2, ..., bN}. Specifically, the identification information (C=1) may indicate that the packet includes the detected N-bit information bits {b1, b2, ..., bN} from among the soft-decision information and the detected N-bit information bits {b1, b2, ..., bN}. Also, the identification information (C=1) may indicate that an error does not exist in the detected N-bit information bits {b1, b2, bN}.

Accordingly, it may be easily recognized whether the packet transmitted by the target access point includes the detected N-bit information bits {b1, b2, ..., bN} using the neighboring router, AP, or destination device.

Conversely, in operation S660, where the error exists in the detected N-bit information bits {b1, b2, ..., bN}, the target access point may quantize LLR{L1, L2, ..., LN} which is the computed soft-decision information. In this instance, the quantized soft-decision information may be represented as {Q1, Q2, ..., QN}.

In operation S670, the target access point may transmit the quantized soft-decision information {Q1, Q2, ..., QN} to the destination device or an AP connected to the destination device, according to a frame configuration of Mode 2.

In this instance, referring to FIG. 7, a packet of Mode 2 may include a header, identification information (C=2), information associated with a delay limit (Delay_t), and the quantized soft-decision information {Q1, Q2, ..., QN}. The delay limit (Delay_t) may indicate a delay limit of a service being provided. The identification information (C=2) may indicate that the packet includes the quantized soft-decision information {Q1, Q2, ..., QN}. Accordingly, the destination device or the AP connected to the destination device may ascertain and extract the identification information (C=2) based on the quantized soft-decision information {Q1, Q2, ..., QN}. Also, the destination device or the AP connected to the destination device may combine soft-decision information received from the plurality of APs, and detect information bits using the combined soft-decision information.

Figure 8:
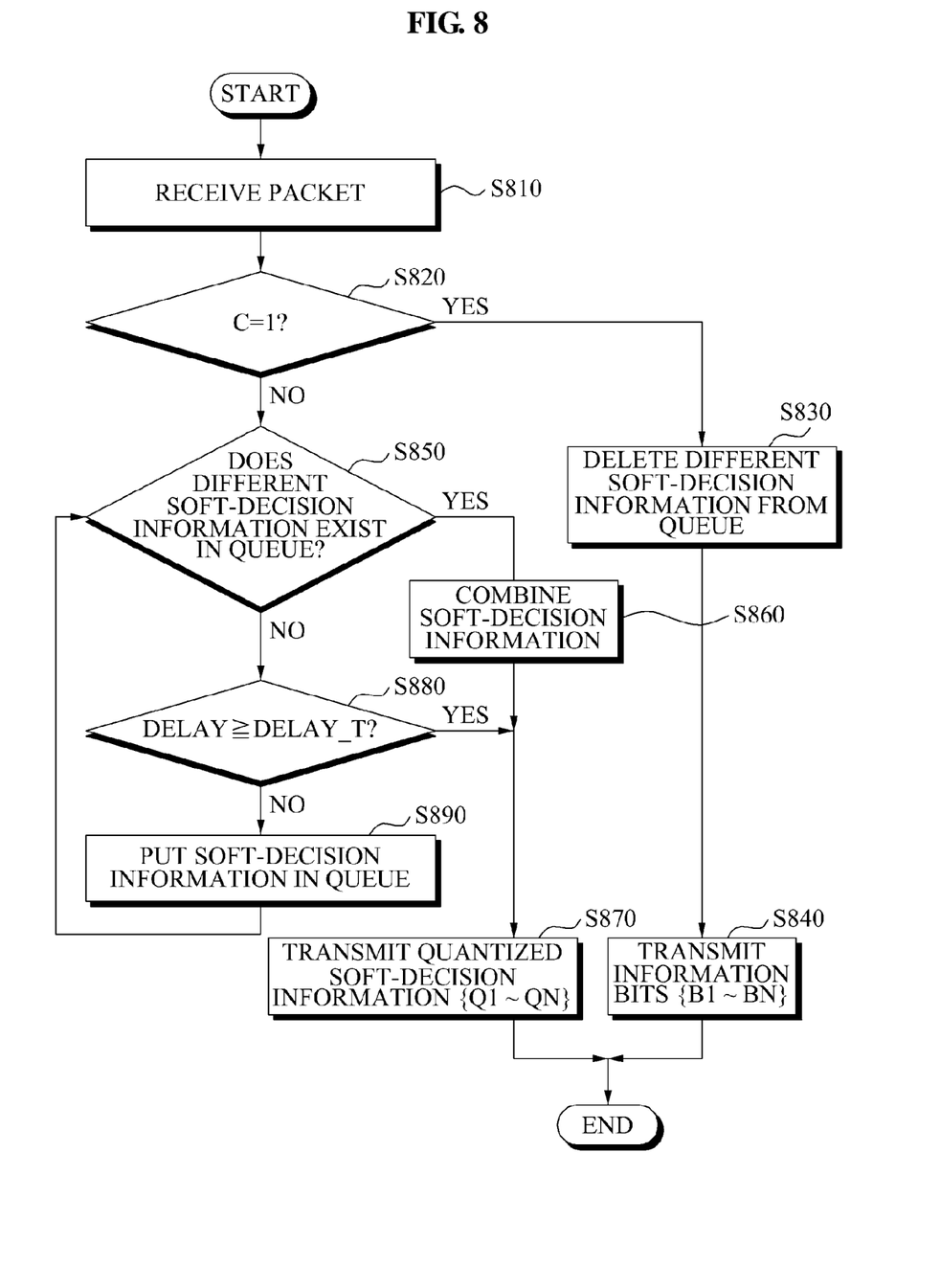
FIG. 8 is a flowchart illustrating a method of operating a router according to an exemplary embodiment.

FIG. 8 is a flowchart illustrating a method of operating a router according to an exemplary embodiment.

Referring to FIG. 8, in operation S810, the router may receive a packet from a plurality of APs or at least one neighbor router. The packet may include soft-decision information with respect to information bits corresponding to a transmission symbol, or information bits.

In operation S820, the router may extract identification information (C) from the packet including the soft-decision information or the information bits, and determine whether the identification information (C) is 1. Where the identification information (C) is 1, it may indicate that the packet includes the information bits. Where the identification information (C) is not 1, it may indicate that the packet includes the soft-decision information.

In operation S830, where the packet includes the information bits {b1, b2, bN}, the router may remove different soft-decision information from a queue. The different soft-decision information may be soft-decision information that has already been received from another AP or another neighbor router. However, the different soft-decision information may be associated with the same transmission symbol.

In operation S840, the router may transmit the information bits {b1, b2, ..., bN} to another router, AP, or destination device.

Conversely, in operation S850, where the identification information (C) is not 1, the router may determine whether the different soft-decision information exists in the queue. Where the different soft-decision information exists in the queue, the different soft-decision information is to be combined with currently received soft-decision information.

In operation S860, where the different soft-decision information exists in the queue, the router may combine the different soft-decision information and the currently received soft-decision information. Accordingly, the combined soft-decision information {L1, L2, ..., LN} may be generated.

In operation S870, the router may quantize the combined soft-decision information {L1, L2, ..., LN}, generate the quantized soft-decision information {Q1, Q2, ..., QN}, and transmit the quantized soft-decision information {Q1, Q2, ..., QN} to the other router, AP, or destination device.

In operation S880, where the different soft-decision information does not exist in the queue, the router may compare an actual delay (Delay) and a delay limit (Delay_t) of a service being provided.

Referring again to FIG. 7, the packet according to the frame configuration of Mode 2 may include information associated with the delay limit. Since services have a variety of delay limits, the router may combine soft-decision information of the plurality of APs based on the various delay limits.

In operation S870, where the actual delay is equal to or greater than the delay limit, the router may combine soft-decision information of at least one AP, quantize the combined soft-decision information, and transmit the quantized soft-decision information {Q1, Q2, ..., QN} to the other router, AP, and destination device.

Conversely, where the actual delay is less than the delay limit, the router may place the currently received soft-decision information in the queue, in operation S890.

Figure 9:
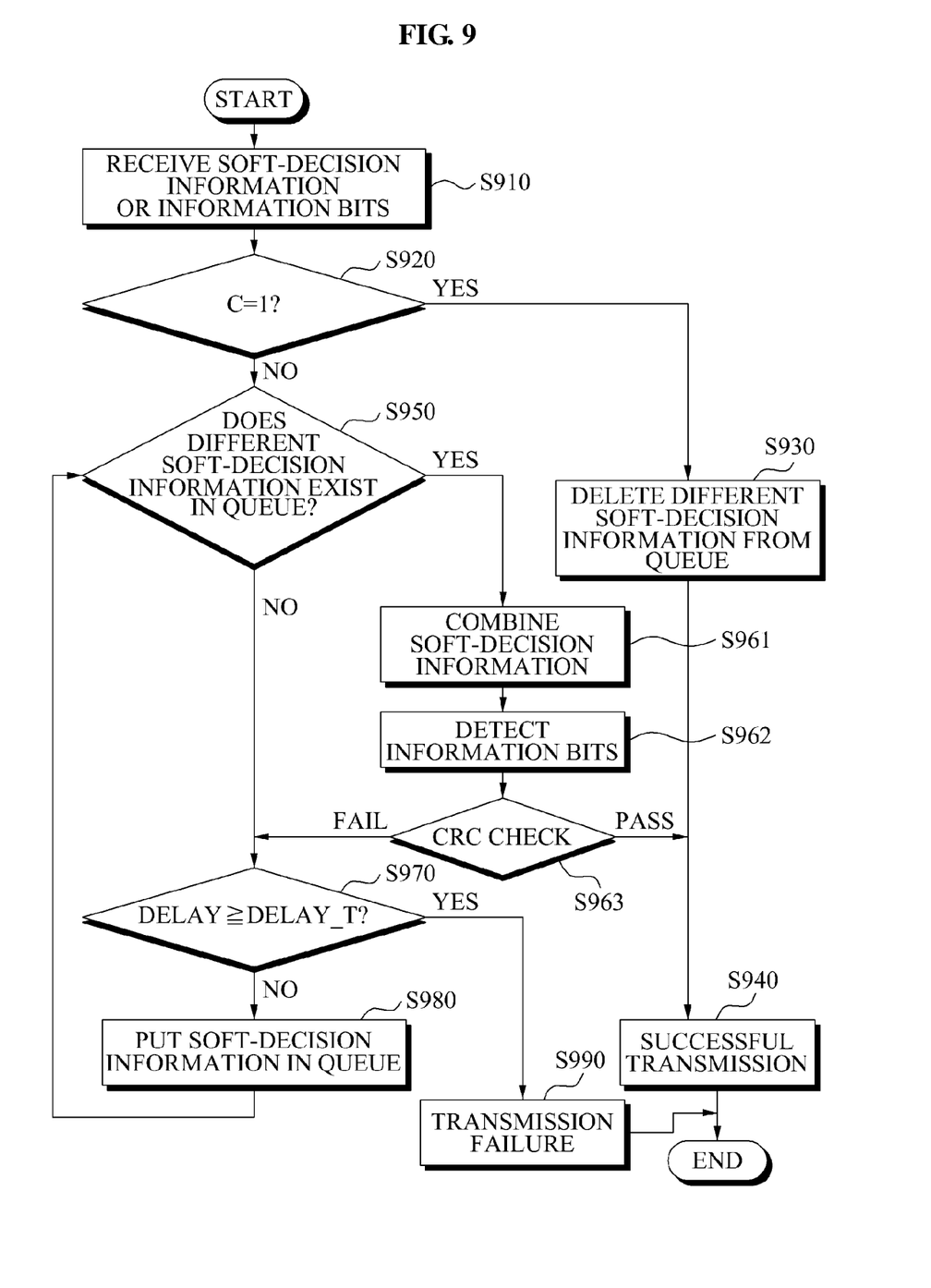
FIG. 9 is a flowchart illustrating a method of operating a destination device or an access point connected to the destination device according to an exemplary embodiment.

FIG. 9 is a flowchart illustrating a method of operating a destination device or an AP connected to the destination device according to an exemplary embodiment.

Referring to FIG. 9, in operation S910, the destination device or the AP connected to the destination device may receive a packet from a plurality of APs. The packet includes soft-decision information or information bits.

In operation S920, the destination device or the AP connected to the destination device may determine which one of the soft-decision information or information bits is included in the packet using identification information (C) included in the packet.

In operation S930, where the identification information (C) is 1, the packet may include the information bits, and thus the destination device or the AP connected to the destination device may remove different soft-decision information existing in a queue.

In operation S940, the destination device or the AP connected to the destination device may determine that the information bits are successfully transmitted. For example, the destination device or the AP connected to the destination device may transmit an acknowledgement (ACK) message to a source device.

However, where the identification information (C) is not 1, the packet may include the soft-decision information, and thus the destination device or the AP connected to the destination device may determine whether different soft-decision information exists in the queue in operation S950.

In operation S961, where the different soft-decision information exists in the queue, the destination device or the AP connected to the destination device may combine currently received soft-decision information and the different soft-decision information existing in the queue. In operation S962, the destination device or the AP connected to the destination device may detect information bits using the combined soft-decision information.

In operation S963, the destination device or the AP connected to the destination device may determine whether an error exists in the detected information bits based on a CRC scheme. In operation S940, where the error does not exist in the detected information bits, the information bits are successfully transmitted, and thus an ACK message may be transmitted to the source device.

In operation S970, where the different soft-decision information does not exist in the queue, the destination device or the AP connected to the destination device may determine whether an actual delay (Delay) is equal to or greater than a delay limit (Delay_t) of a service being provided.

In operation S990, where the actual delay is equal to or greater than the delay limit, the transmission of the information bits fails, and thus the destination device or the AP connected to the destination device may request the source device for retransmission.

Conversely, where the actual delay is less than the delay limit, the destination device or the AP connected to the destination device may place the currently received soft-decision information in the queue in operation S980.

The methods described above including a method of operating a target access point, router, destination device or access point connected to the destination device may be recorded, stored, or fixed in a computer-readable medium, or a plurality of computer-readable media, that includes program instructions to be implemented by a computer to cause a processor to execute or perform the program instructions. The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above.

Although it is not illustrated in FIGS. 1 through 9, a communication device including a destination device or an AP connected to the destination device may include a receiving unit, combining unit, detection unit, and error check unit. The receiving unit may receive soft-decision information about information bits corresponding to a transmission symbol from a plurality of APs. The transmission symbol may be transmitted from a source device to the destination device. The combining unit may combine the soft-decision information of the plurality of APs. The detection unit may detect the information bits using the combined soft-decision information. The error check unit may check for an error in the detected information bits. In this instance, the receiving unit may further receive identification information. The soft-decision information or the information bits detected by the at least one of the plurality of APs may be identified based on the identification information. Also, the communication device may further include an identification unit to identify the soft-decision information and information bits detected by at least one of the plurality of APs using identification information.

A detailed description of the communication device may be omitted, since descriptions with reference to FIGS. 1 through 9 may be applied to the communication device.

According to certain exemplary embodiments described above, an AP may transmit soft-decision information to enable a destination device or an AP connected to the destination device to obtain a diversity gain.

Also, a destination device or an AP connected to the destination device may combine soft-decision information of a plurality of APs, detect information bits using the combined soft-decision information, and thereby may improve a capacity.

Further, a router or APs may transmit combined or uncombined soft-decision information to a destination device or an AP connected to the destination device, and thereby may reduce an overhead generated to obtain a diversity gain.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method comprising: receiving a transmission symbol transmitted by a source device to a destination device; computing soft-decision information for a soft decision with respect to information bits corresponding to the transmission symbol; detecting the information bits based on the computed soft-decision information; determining whether an errant bit exists in the detected information bits; selecting, based upon the determination, either the soft-decision information or the detected information bits for transmission as selected information; and transmitting the selected information and content information identifying whether the soft-decision information or the detected information bits is the selected information to the destination device or an access point connected to the destination device, wherein the destination device or the access point connected to the destination device combines the soft-decision information transmitted by each of a plurality of access points, and wherein the soft-decision information includes a log likelihood ratio (LLR).

2. The method of claim 1, further comprising:
selecting the detected information bits as the selected information if no errant bit is determined to exist in the detected information bits; and selecting the soft-decision information as the selected information if an errant bit is determined to exist in the detected information bits.

3. The method of claim 1, wherein the destination device or the access point connected to the destination device detects the information bits using the combined soft-decision information.

4. The method of claim 1, wherein the receiving directly receives or overhears the transmission symbol.

5. The method of claim 1, wherein the transmitting quantizes the soft-decision information and transmits the quantized soft-decision information.

6. The method of claim 1, wherein the transmitting further transmits information associated with a delay limit corresponding to the transmission symbol.

7. The method of claim 1, wherein the transmitting of the soft-decision information includes quantizing the soft-decision information to generate quantized soft-decision information.

8. The method of claim 1, wherein the destination device or the access point obtains a diversity gain based on the combining of the soft-decision information.

9. The method of claim 1, wherein the selected information and content information are transmitted through the Internet to the destination device or the access point connected to the destination device.

10. The method of claim 1, wherein the selected information and content information are transmitted to the destination device.

11. A method of operating a destination device or an access point connected to the destination device, the method comprising: receiving packetized information, corresponding to a transmission symbol, from an access point, the transmission symbol being transmitted from a source device to the destination device; determining whether the packetized information includes detected information bits or soft-decision information, based upon a content identifier included within the packetized information; and combining, if the packetized information is determined to include the soft-decision information, this soft-decision information with soft-decision information received from another access point and detecting the information bits using the combined soft-decision information, wherein: the soft-decision information includes a log likelihood ratio (LLR), and the access point transmits either the detected information bits or soft-decision information as the packetized information based upon a determination of whether an errant bit exists in the detected information bits.

12. The method of claim 11, further comprising:
checking to find an error in the information bits detected using the combined soft-decision information.

13. The method of claim 11, further comprising:
retrieving from a queue soft-decision information received from a plurality of access points, wherein
the combining combines the soft-decision information of the plurality of access points based on the retrieved soft-decision information.

14. The method of claim 11, further comprising:
placing the soft-decision information in a queue according to a delay limit corresponding to the transmission symbol.

15. The method of claim 11, wherein the packetized information and content identifier are received through the Internet.

16. The method of claim 11, wherein the method is executed by the destination device.

17. A non-transitory computer-readable recording medium storing a program to implement an operation of a target access point, comprising instructions to cause a computer to: receive a transmission symbol transmitted by a source device to a destination device; compute soft-decision information for a soft decision with respect to information bits corresponding to the transmission symbol; detect the information bits based on the computed soft-decision information; determine whether an errant bit exists in the detected information bits; select, based upon the determination, either the soft-decision information or the detected information bits for transmission as selected information; and transmit the selected information and content information identifying whether the soft-decision information or the detected information bits is the selected information to the destination device or an access point connected to the destination device, wherein the soft-decision information includes a log likelihood ratio (LLR).

18. The medium of claim 17, wherein the selected information and content information are transmitted to the destination device or the access point connected to the destination device through the Internet.

19. The medium of claim 17, wherein the selected information and content information are transmitted to the destination device.

20. A communication device of a destination device or an access point connected to the destination device, the communication device comprising: a receiving unit configured to receive packetized information, corresponding to a transmission symbol, from an access point, the transmission symbol being transmitted from a source device to the destination device; a determining unit configured to determine whether the packetized information includes detected information bits or soft-decision information, based upon a content identifier included within the packetized information; a combining unit configured to combine, if the packetized information is determined to include the soft-decision information, this soft-decision information with soft-decision information received from another access point; a detection unit configured to detect the information bits using the combined soft-decision information; and an error check unit configured to check to find an error in the information bits detected by the detection unit, wherein: the soft-decision information includes a log likelihood ratio (LLR), and the access point transmits either the detected information bits or soft-decision information as the packetized information based upon a determination of whether an errant bit exists in the detected information bits.

21. The communication device of claim 20, wherein the packetized information and content identifier are received through the Internet.

22. The communication device of claim 20, wherein the communication device is the destination device.

* * * * *